Dec. 27, 1949     A. PALME     2,492,762
ELECTRIC SWITCH
Filed Aug. 23, 1944
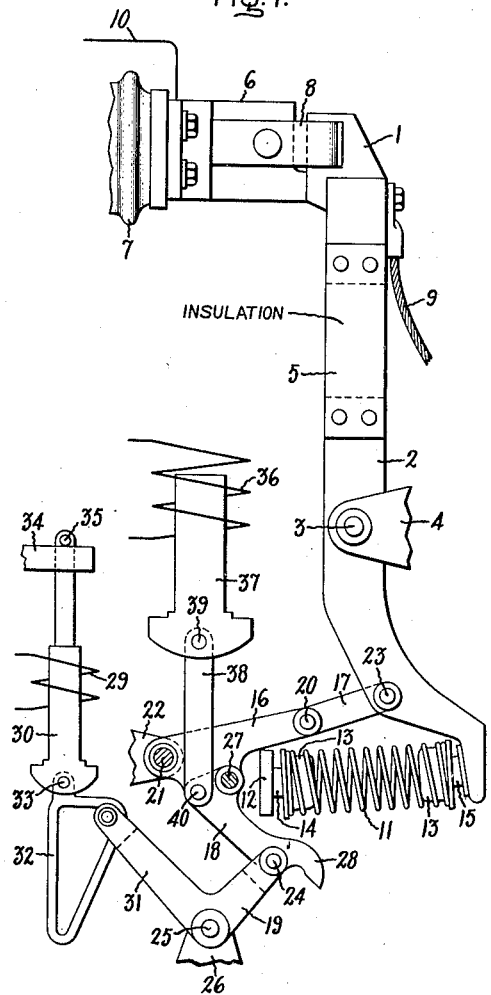
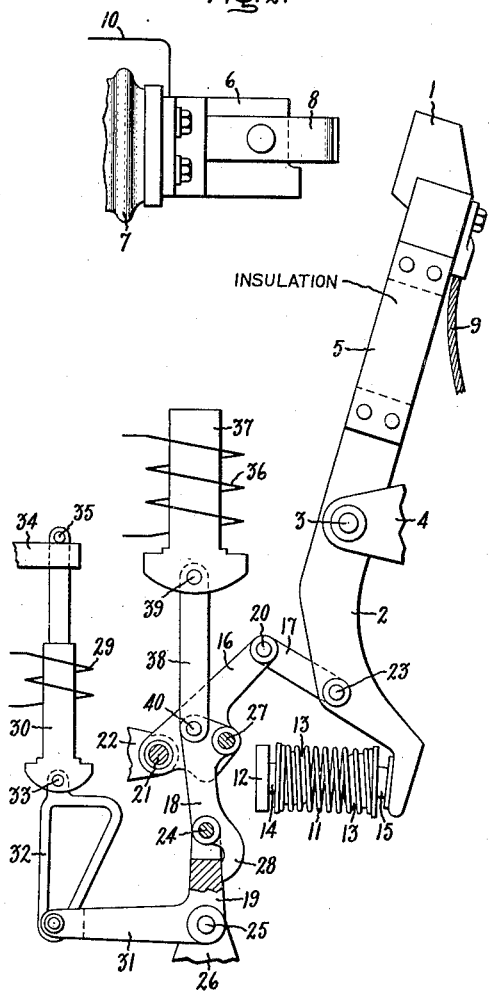
Inventor:
Arthur Palme,
by Harry E. Dunham
His Attorney.

Patented Dec. 27, 1949

2,492,762

UNITED STATES PATENT OFFICE 2,492,762

ELECTRIC SWITCH

Arthur Palme, Pittsfield, Mass., assignor to General Electric Company, a corporation of New York Application August 23, 1944, Serial No. 550,696

9 Claims. (Cl. 200—98)

My invention relates to improvements in electric switches and more particularly electric switches which are positively mechanically held by a toggle in the open and closed positions and yet quickly operable from at least one of these positions to the other.

In the application of ground fault neutralizers to the protection of alternating current systems against transient ground faults, it is common, as disclosed for example in United States Letters Patent 2,258,248, issued October 7, 1941, to provide an arrangement for short circuiting the ground fault neutralizer in case of permanent faults so that these can be cleared by the system protective relays. This short circuiting action is generally effected by the closing of a normally open switch in a circuit to ground in parallel with the ground fault neutralizer after a ground fault has lasted longer than a time sufficient for the normal arc extinction action of the ground fault neutralizer. Since the fault current through the switch may be quite large, it is essential that the switch be positively prevented from opening in consequence of magnetic forces. If an alternating current system embodies two or more ground fault neutralizers, it is desirable that the grounding switches close quickly so as to have the least possible time differential effect in establishing the neutralizing action at the different points. Otherwise the closing action of some of the switches may be so disturbed that they fail to close and provide the grounding connections necessary for the proper responsive action of the system relays. Also it has been proposed, as disclosed for example in United States Letters Patent 2,258,246, dated October 7, 1941, that, in the event of a failure of the system protective relays or the circuit breakers controlled thereby to clear a permanent fault, the short circuit be removed to restore the current limiting action of the ground fault neutralizer. In this case, the grounding switch may require a relatively high interrupting capacity.

An object of my invention is to provide an improved electric switch which is positively held in both the open and closed positions by readily releasable mechanisms in order to insure quick operation of the switch. Another object of my invention is to provide an improved electric switch with mechanical holding means such as to prevent the opening of the switch particularly under the magnetic effects of large currents carried by the switch. Still another object of my invention is to provide an improved electric switch double interconnected toggle-operating mechanism which closes quickly. A further object of my invention is to provide an improved electric switch which is relatively simple and economical and which can readily be immersed in an insulating fluid to provide a relatively large interrupting capacity. These and other objects of my invention will appear in more detail hereinafter.

In accordance with my invention, I provide an improved electric switch whose movable circuit controlling member is respectively held in two different circuit controlling positions by two collapsible mechanisms which are so interconnected and controlled as to permit movement of the member from either of said circuit controlling positions to the other thereof to release the mechanism holding the member in either position and to set the other mechanism when the member is moved to the other position. Also in accordance with my invention, the two collapsible mechanisms can be two toggles one of which has one end thereof pivotally interconnected intermediate the ends of the other toggle and the other of which has one of its ends pivotally connected to the member. Further in accordance with my invention, I provide means in which energy is stored during movement of the circuit controlling member from one circuit controlling position to the other quickly to effect the reverse movement of the member when the holding mechanism is released.

My invention will be better understood from the following description when considered in connection with the accompanying sheet of drawings, and its scope will be pointed out in the appended claims.

In the accompanying sheet of drawings, Fig. 1 illustrates in vertical side elevation an electric switch embodying my invention and shown in the circuit closed position, and Fig. 2 is an elevation similar to Fig. 1 showing the switch in the circuit open position.

In the illustrated embodiment of my invention, a movable circuit controlling member 1 is carried on an arm 2 which is pivotally mounted at 3 on a fixed support 4. As shown, the arm 2 includes an intervening section 5 of suitable insulating material whereby to insulate the contact 1 from the operating parts of the switch. The member 1 is in effect a movable contact which cooperates with a stationary terminal contact 6 mounted on suitable insulating means 7. Also illustrated, the contact 6 comprises jaw contact elements 8. Also, the movable contact 1 has suitably conductively connected thereto a flexible current conductor 9 which extends to a suitable stationary insulating means, not shown. The circuit through the switch from an incoming lead 10 includes then the terminal contact 6, the contact jaws 8, the movable contact 1, and the flexible conductor 9.

For quickly moving the contact 1 to the closed circuit position, I provide suitable energy storing means such as the resilient element or spring 11 in which energy is stored during the opening movement of the contact 1 to effect the closing movement thereof when desired. As shown, the spring 11 is a compression spring which is positioned between a fixed abutment 12 and the lower end of the arm 2 below the pivot 3. For suitably anchoring the ends of the spring 11, I provide cups 13 which are carried by the spring at the ends thereof and which seat on projections 14 and 15 on the abutment 12 and the arm 2, respectively. With this arrangement, it will be obvious that the spring 11 tends to move the arm 2 counterclockwise, that is, to close the switch.

For holding the circuit controlling member or contact 1 in two different circuit controlling positions, such as the circuit open and circuit closed positions shown, I provide in accordance with my invention two interconnected alternately oversettable and collapsible toggle mechanisms which are respectively shown as a first toggle comprising links 16 and 17 for holding the switch closed and a second toggle comprising links 18 and 19 for holding the switch open against the bias of the spring 11. The toggle links 16 and 17 are pivotally interconnected at 20 and respectively pivoted at 21 to a stationary support 22 and to the arm 2 at 23 so that one end of the toggle is fixed and the other end is movable with the switch arm 2. In the closed position of the switch shown in Fig. 1, the toggle 16—17 is overset so as to hold the switch closed, that is, the center of the pin 20 is below a straight line through the centers of the pins 21 and 23 with motion limited in the overset direction by the link 16 bearing against the abutment 12. The toggle links 18 and 19 are pivotally interconnected at 24 and respectively pivoted at 25 to a stationary support 26 and to the link 16 at an intermediate point 27 while the movable end pivot 27 of the second toggle lies intermediate the fixed end pivot 21 and the knee pivot 20 of the first toggle. Motion of the toggle pivot 24 in the toggle holding direction is limited by an extension 28 on the link 18. In the open position of the switch, shown in Fig. 2, this extension 28 abuts the link 19 to maintain the toggle 18—19 in the overset thrust transmitting condition with the toggle overset, that is, the center of the pin 24 is to the left of a straight line through the centers of the pins 25 and 27. For convenience in designating the links of the toggles, I choose to define the links 16 and 19, which have the stationary pivots 21 and 25, respectively, as confined links and the links 17 and 18 are free links.

For controlling the toggles 16—17 and 18—19 to permit movement of the contact 1 from either of its circuit controlling positions to the other thereof, I provide in accordance with my invention means operative to release the toggle holding the contact in either position and to overset the other toggle when the member is moved to the other position. As shown, the means for releasing or collapsing the toggle 18—19 from the holding position shown in Fig. 2 comprises an electromagnet having an energizing winding 29 and an armature 30 which is arranged upon movement to the attracted position to turn the link 19 clockwise so as to break the toggle 18—19.

For this purpose, I provide the link 19 with a rigid arm 31 which is coupled to the armature 30 by a lost motion link 32 pivotally connected to the armature at 33. Movement of the armature 30 to the unattracted position is limited by a stop 34 against which a projection 35 on the armature 30 comes to rest upon deenergization of the winding 29.

For collapsing the toggle 16—17, opening the switch and compressing the spring 11, and setting the toggle 18—19, I provide in accordance with my invention suitable means such as an electromagnet comprising an energizing winding 36 and an armature 37. The armature 37 is coupled to the toggle link 18 through a link 38 which is pivoted to the armature at 39 and to the toggle link 18 by the pivot 40. The pivot 40 is so located as to lie between the pivots 21 and 27 associated with the toggle link 16. This offset connection enables the operating electromagnet 36 to perform a double successive function, namely, first collapse the toggle links 16 and 17 and then overset the toggle links 18 and 19 to maintain the toggle links 16 and 17 collapsed.

Assuming the switch is closed as shown in Fig. 1, then the toggle 16—17 is overset firmly to maintain the contact 1 in engagement with the contact jaws 8 of the terminal contact 6 against magnetic influences in consequence of currents which may be passing through the switch. When it is desired to open the switch, the winding 36 is energized to raise the armature 37 from the position shown in Fig. 1 to the position shown in Fig. 2. As the armature rises, the toggle link 16 is turned counterclockwise to release the toggle 16—17. With the continued upward movement of the armature, the toggle link 16 continues to move counterclockwise thus further collapsing the toggle 16—17 and rotating the contact carrying arm 2 clockwise about its pivot 3 to reenergize the spring 11. During this upward movement of the armature 37, the toggle 18—19 is straightened until the final phase of the opening movement when the extension 28 on the toggle link 18 abuts the toggle link 19 as shown in Fig. 2. In this position, the energy stored in the spring 11 acting through the arm 2 and the toggle link 17 tends to turn the toggle link 16 clockwise. Through the pivot 27, this applies a torque to the toggle link 18 tending to turn it clockwise about its pivot 24. However, such clockwise movement is prevented by virtue of the toggle link extension 28 abutting the toggle link 19. In consequence, the switch is firmly maintained in the circuit open position.

When it is desired to close the switch, the winding 29 is energized to attract the armature 30. Upward movement of the armature 30 rotates the toggle link 19 clockwise about its pivot 25 whereby to release the toggle 18—19 thus permitting the energy stored in the spring 11 to turn the contact arm 2 counterclockwise to the closed position shown in Fig. 1. During this movement, the toggle 16—17 drops into the overset position shown. In the closed position of the switch, the armature 30 is free to return to the unattracted position upon deenergization of the winding 29 by reason of the lost motion link 32. Also, as soon as the toggle 18—19 is broken during the closing operation of the switch, the toggle link 19 with its rigid extension 31 is free to rotate clockwise independently of movement of the armature 30 because of the lost motion link 32.

From the foregoing, it will be apparent to those skilled in the art that switches embodying my invention are relatively compact and simple in form and readily adaptable to immersion in a suitable insulating fluid such as oil whereby relatively large currents can be satisfactorily interrupted.

While I have shown and described my invention in considerable detail, I not desire to be limited to the exact arrangement shown, but seek to cover in the appended claims all those modifications that fall within the true spirit and scope of my invention.

What I claim as new and desire to secure by Letters Patent of the United States is:

1. An electric switch comprising a movable circuit controlling member, two toggles arranged to be overset but one at a time for respectively holding said member in two different circuit controlling positions, the free link of one of said toggles being pivotally connected to the other toggle intermediate the ends of the confined link thereof and the free link of said other toggle being pivotally connected to said member, and means respectively connected to the two links of one of said toggles for controlling said toggles to permit movement of the member from either of said positions to the other thereof operative to release the toggle holding the member in either of said positions and to set the other toggle when the member is moved to the other of said positions.

2. An electric switch comprising a movable circuit controlling member, a first toggle mechanism for holding said member in the circuit open position, a second toggle mechanism for holding said member in the circuit closing position, a first electromagnetic means for collapsing said first mechanism when the member is in said circuit open position and setting said second mechanism when the member is in the circuit closing position, a lost motion connection between said first electromagnetic means and the confined link of said first mechanism, and a second electromagnetic means for collapsing said second mechanism when the member is in the circuit closing position and setting said first mechanism when the member is in the circuit open position said second electromagnetic means being connected to the free link of said first mechanism.

3. An electric switch comprising a movable circuit controlling member, resilient means tending to move said member to the circuit closed position, a first toggle for holding said member in the circuit open position against the bias of said resilient means, a second toggle for holding said member in the circuit closed position, a fresh electromagnetic means for releasing said first toggle to permit said resilient means to move said member to the closed position operative to effect the setting of said second toggle when the member reaches the closed position, a lost motion connection between said first electromagnetic means and the confined link of said first toggle, and a second electromagnetic means for releasing said second toggle and returning said member to the circuit open position against the bias of said resilient means operative to set said first toggle when the member reaches the circuit opening position said second electromagnetic means being connected to the free link of said first toggle.

4. An electric switch comprising a movable circuit controlling member, two toggles arranged to be overset but one at a time for respectively holding said member in two different circuit controlling positions, the free link of one of said toggles being pivotally connected to the other toggle intermediate the ends of the confined link thereof and the free link of said other toggle being pivotally connected to said member, actuating means connected to the free link of said one toggle for exerting thereon a force for releasing said other toggle and subsequently setting said one toggle, and actuating means for exerting on the confined link of said one toggle a force for releasing said one toggle and subsequently setting said other toggle.

5. An electric switch comprising a movable circuit controlling member, resilient means in which energy is adapted to be stored for moving said member to the circuit closed position, two toggles arranged to be overset but one at a time for respectively holding said member in the circuit closed and circuit open positions, the free link of one of said toggles being pivotally connected to the other toggle intermediate the ends of the confined link thereof and the free link of said other toggle being pivotally connected to said member, actuating means connected to the free link of said one toggle for exerting thereon a force for releasing said other toggle, storing energy in said resilient means and subsequently setting said one toggle to hold said member in the circuit open position, and actuating means for exerting on the confined link of said one toggle a force for releasing said one toggle to permit movement of the member to the circuit closed position under the bias of said resilient means and for subsequently setting said other toggle to maintain said member in the circuit closed position.

6. An electric switch comprising a circuit-controlling member movable between two positions and having a first operating toggle overset for holding the member in one position, a second operating toggle interconnected intermediate the ends of the first toggle to overset the first toggle when the second toggle is collapsed, an electromagnet connected only to collapse the second toggle, and a separately energizable electromagnet connected with the second toggle both to collapse the first toggle to move the circuit controlling member to the other position and overset the second toggle to hold the first toggle collapsed.

7. An electric switch comprising a circuit controlling member movable between two positions, a first toggle connected to move the member to one position when the toggle is collapsed and to the other position when the toggle is overset for holding the member therein, a second toggle having one end connected intermediate the ends of the first toggle to overset the first toggle when the second toggle is collapsed, an electromagnet connected to collapse the second toggle, and a separate electromagnet connected both to collapse the first toggle and overset the second toggle to hold the first toggle collapsed.

8. An electric switch comprising a circuit controlling member movable between two positions and having biasing means for moving the member from one circuit controlling position to the other, a first toggle connected with the movable member to be collapsed when the member is in the one position and to be overset for holding the member in the other position, a second toggle having one end thereof interconnected intermediate the ends of the first toggle to overset the first toggle when the second toggle is collapsed, an electromagnet having a lost-motion connection only for collapsing the second toggle, and a second electromagnet connected with the second toggle both to collapse the first toggle to effect snap movement of the member in accordance with the bias and to overset the second toggle to hold the first toggle collapsed.

9. An electric switch comprising a circuit-controlling member pivotally mounted for movement between two positions and having biasing means for moving the member from one position to the other, a first toggle having its movable end connected with the circuit-controlling member to be collapsed when the member is in the one position and to be overset for rigidly holding the member in the other position, a second toggle having its movable end connected between the fixed end and the knee of the first toggle to overset the first toggle when the second toggle is collapsed, an electromagnet having a lost-motion connection only for collapsing the second toggle, and a second electromagnet having an offset connection with the said movable end of the second toggle both for collapsing the first toggle to effect snap movement of the member from the one position to the other position in accordance with its bias and for oversetting the second toggle to hold the first toggle collapsed.

ARTHUR PALME.

REFERENCES CITED

The following references are of record in the file of this patent:

UNITED STATES PATENTS

| Number | Name | Date |
| --- | --- | --- |
| 962,958 | Hewlett | June 28, 1910 |
| 1,225,686 | Stratton | May 8, 1917 |
| 1,306,340 | Krantz | June 10, 1919 |
| 1,396,094 | Burnham | Nov. 8, 1921 |
| 2,274,350 | Thumim | Feb. 24, 1942 |
| 2,348,021 | Oppel | May 2, 1944 |

FOREIGN PATENTS

| Number | Country | Date |
| --- | --- | --- |
| 212,054 | Germany | July 12, 1909 |

Certificate of Correction

Patent No. 2,492,762　　　　　　　　　　　　　　　　　　　　December 27, 1949

ARTHUR PALME

It is hereby certified that errors appear in the printed specification of the above numbered patent requiring correction as follows:

Column 3, line 61, for the words "are free" read *as free*; column 5, line 56, for "fresh" read *first*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*